United States Patent
Schmale et al.

(10) Patent No.: US 8,459,605 B2
(45) Date of Patent: Jun. 11, 2013

(54) RAIL SYSTEM AND VEHICLE SEAT

(75) Inventors: Uwe Schmale, Hückeswagen (DE); Paul Frank, Köln (DE); Allen Sorgenfrei, Stuttgart (DE)

(73) Assignee: Johnson Controls Technology Company, Holland, MI (US)

( * ) Notice: Subject to any disclaimer, the term of this patent is extended or adjusted under 35 U.S.C. 154(b) by 642 days.

(21) Appl. No.: 12/514,892

(22) PCT Filed: Oct. 16, 2007

(86) PCT No.: PCT/EP2007/008965
§ 371 (c)(1),
(2), (4) Date: Feb. 19, 2010

(87) PCT Pub. No.: WO2008/058603
PCT Pub. Date: May 22, 2008

(65) Prior Publication Data
US 2010/0213342 A1    Aug. 26, 2010

(30) Foreign Application Priority Data
Nov. 15, 2006   (DE) .......................... 10 2006 054 129

(51) Int. Cl.
*F16M 13/00* (2006.01)
(52) U.S. Cl.
USPC ......................................... 248/430; 248/429
(58) Field of Classification Search
USPC .............. 297/311, 312, 344.1, 344.24, 452.4; 296/65.13–65.15; 248/430, 429, 424
See application file for complete search history.

(56) References Cited

U.S. PATENT DOCUMENTS

| | | | | |
|---|---|---|---|---|
| 2,805,701 | A | * | 9/1957 | McCormick .................. 248/430 |
| 2,865,427 | A | * | 12/1958 | Garfield ..................... 297/256.1 |
| 4,432,525 | A | * | 2/1984 | Duvall .......................... 248/430 |
| 5,192,045 | A | | 3/1993 | Yamada |
| 2010/0187397 | A1 | * | 7/2010 | Yamada et al. ............... 248/429 |

FOREIGN PATENT DOCUMENTS

| | | |
|---|---|---|
| DE | 42 01 354 A1 | 7/1992 |
| DE | 20004346 U1 | 11/2000 |
| DE | 10231097 A1 | 1/2004 |
| DE | 102005020671 B3 | 3/2006 |
| DE | 102006037344 | 2/2008 |
| EP | 0940288 A2 | 9/1999 |
| EP | 1228922 A1 | 8/2002 |
| JP | 2004210241 A * | 7/2004 |
| WO | 97/45289 A1 | 12/1997 |
| WO | 0189909 A1 | 11/2001 |

* cited by examiner

*Primary Examiner* — Alfred J Wujciak
(74) *Attorney, Agent, or Firm* — Fletcher Yoder P.C.

(57) ABSTRACT

A rail system for a vehicle seat comprises at least one profiled fitting part and at least one cross member. The cross member is arranged perpendicular to a main direction of travel. The at least one fitting part completely surrounds the cross member. The cross member is able to be moved in relation to the fitting part perpendicular to the main direction of travel. Rolling bodies guide the cross member in the interior of the fitting part, and are arranged between the cross member and the fitting part.

19 Claims, 6 Drawing Sheets

RAIL SYSTEM AND VEHICLE SEAT

CROSS REFERENCE TO RELATED APPLICATIONS

This application claims priority from and the benefit of PCT Application No. PCT/EP2007/008965, filed on Oct. 16, 2007 and German Patent No. DE 10 2006 054 129.4, filed on Nov. 15, 2006; both entitled "Rail System and Vehicle Seat", which are herein incorporated by reference.

BACKGROUND

The invention relates to a vehicle seat which is configured to be displaceable. Preferably, the displacement takes place in the transverse direction of the seat and vehicle (Y-direction of the vehicle) or in a direction with a component in the Y-direction. In particular, a displacement is provided in the Y-direction as well as in the longitudinal direction of the seat and vehicle (X-direction of the vehicle, i.e. parallel to a main direction of travel). The displacement in the Y-direction and X-direction may take place independently of one another or even, by using coupling means, in a dependent manner. The invention further relates to a rail system disclosed below in various preferred embodiments, which is suitable for use in such a vehicle seat but may also have other applications.

The invention is based on a vehicle seat which is disclosed in the patent application DE 10 2006 037 344. The content of this publication specifically forms part of the disclosure of the present invention. The aforementioned prior art relates to a vehicle seat, the seat part thereof, on the one hand, being able to be lowered at the front by means of an articulated arm and, on the other hand, being configured to be displaceable in the transverse direction (Y-direction of the vehicle). The transverse guidance takes place at the front of the seat part via a rod guiding the articulated arm in a rotationally movable manner, and at the rear of the seat part via a rod-like sliding element extending parallel to this rod. The rail system according to the invention is disclosed below in the example of this rear transverse guidance in different embodiments. Support devices are further disclosed from the publications DE 102 31 097 A1 and DE 200 04 346 U1, for the adjustable retention of vehicle seats, the support device comprising a support means aligned perpendicular to the direction of travel, which is connected to a vehicle seat, and a cross member with a circular cross section configured as a tubular profile, the support means completely surrounding the cross member and the support device comprising a bearing element, in which the cross member is displaceably guided relative to the bearing element. Moreover, further vehicle seats are disclosed from the publications DE 10 2005 020 671 B3, EP 1 228 922 A1 and EP 0 940 288 A2, which are displaceably arranged perpendicular to the main direction of travel of a vehicle. The publication WI 01/899909 discloses a telescopic mechanism having rolling bodies between an inner member and an outer member.

SUMMARY

It is the object of the present invention to fasten a vehicle seat to a vehicle body, such that in a comparatively simple manner a vehicle seat which is movable perpendicular to the main direction of movement of a vehicle is fastened to a vehicle body, which has relative to the prior art markedly increased stability relative to dynamic effects, the dynamic effects acting on the vehicle seat both parallel to the main direction of travel (X-direction), for example by deceleration forces in the event of an accident, and in the vertical direction (Z-direction), for example due to the weight force of an occupant, and, at the same time, a transverse movement of the seat being possible, i.e. perpendicular to the main direction of travel (Y-direction) with a force expenditure which is considerably lower in comparison with the prior art, in particular also in the case of a relatively large vertical weight force acting on the rail system.

This object is achieved according to the invention by a rail system with the features of claim 1 so that, on the one hand, the at least one cross member is completely surrounded by the at least one fitting part, so that a high degree of stability is ensured in the event of dynamic effects perpendicular to the cross member and, on the other hand, rolling bodies are arranged between the cross member and the fitting part, so that a smooth transverse displacement is achieved even with relatively high dynamic effects perpendicular to the cross member. Preferably, the rolling bodies have a spherical shape. Moreover, relatively cost-effective production is possible, as the rail system only has a minimum number of different components, which may all be produced by known and cost-effective methods. Preferably, it is common to all embodiments of the invention that the rail system comprises at least one base body and/or cross member extending in a profile-like manner in the longitudinal rail direction, i.e. in particular perpendicular to the main direction of travel (i.e. in the specific exemplary embodiment in the Y-direction), and comprises at least one sleeve and/or fitting part arranged displaceably thereon, which is displaceably mounted on the cross member via the preferably spherical rolling bodies arranged between the fitting part and the cross member. Viewed in cross section, the bearing arrangement preferably has a total of four rolling bodies spaced apart from one another. Preferably, this arrangement is repeated at least twice in the longitudinal rail direction and/or perpendicular to the main direction of travel. The bearing arrangement, therefore, provides support in all directions which deviate from the longitudinal rail direction.

Advantageous embodiments and developments of the invention may be derived from the sub-claims as well as the description by referring to the drawings.

According to a preferred development, the fitting part is arranged on longitudinal rails and is displaceable relative to the longitudinal rails parallel to the main direction of travel. Advantageously, therefore, a vehicle seat is produced which is displaceable in the longitudinal direction, in the transverse direction and/or in a direction with a component in the transverse direction and a component in the longitudinal direction. Preferably, displacements are provided in the transverse and longitudinal direction which are independent from one another and/or dependent on one another by using coupling means.

According to a further preferred development, between the cross member and at least one rolling body a clamping element is arranged such that a dynamic effect of the rolling body is produced in the direction of the fitting part by the clamping force of the clamping element. Advantageously, therefore, on the one hand, clearances are prevented between the rolling body and the cross member and thus a relative movement between the cross member and the fitting part perpendicular to the cross member and, on the other hand, the production tolerances of the rail system components are considerably increased and thus a more cost-effective production process permitted. In particular, it is preferred according to the invention that the clamping element has a progressive characteristic curve as regards dimensional tolerances, in particular dimensional tolerances of the rolling body. As a result, it is advantageously possible according to the invention that in a pre-determined dimensional tolerance field, only minimum tiltability is possible with a predetermined tilting moment. For example, the requirement may be fulfilled that a predetermined force (of for example 900 N) acting on the vehicle seat (for example on the backrest of the vehicle seat), which exerts a tilting moment and/or a torque on the cross member (and thus a deflection force on the clamping element at the bearing point between the rolling body and the clamping element), only produces a maximum tilting angle of, for example, 0.33° in both directions (and/or a total tilting angle of, for example, approximately)0.6°. To this end, it is provided that the clamping element is fastened to the cross member (for example to a hollow tube of the cross member) such that, due to the shape of the clamping element and due to the connection of the clamping element to the cross member and by considering the dynamic effect between the rolling body and the clamping element, it results in a progressive spring characteristic curve and/or progressive characteristic curve of the clamping element (in particular as regards the dimensional tolerance of the diameter and/or the arrangement of the rolling body). According to the invention, this may, for example, be implemented by the clamping element at least partially bearing and/or resting on the cross member and/or on the hollow tube of the cross member, the contact point between the cross member and the clamping element being displaced when deflecting the clamping element and thus the spring characteristic curve becoming progressive (for example in the direction of greater forces (i.e. a progressively increasing spring characteristic curve) by reducing the effective spring lever arm of the clamping element, if the contact point between the cross member and the clamping element when deflecting the clamping element is displaced closer to the line of force between the clamping element and the rolling body or, for example, in the direction of lower forces (i.e. a progressively falling spring characteristic curve) by increasing the effective spring lever arm of the clamping element if the contact point between the cross member and the clamping element when deflecting the clamping element is displaced closer to the line of force between the clamping element and the rolling body).

According to a further preferred development, at least two rolling bodies are arranged mirror-symmetrically and/or rotationally-symmetrically about the cross member, in particular the mirror plane and/or the rotational axis extending through a central point of the cross member in a longitudinal direction. Advantageously, therefore, a stable and secure arrangement of the cross member in the fitting part may be created in a simple manner, and at the same time contact between the cross member and the fitting part is reliably prevented. As a result, the transverse displacement of the cross member relative to the fitting part is possible with considerably less force expenditure relative to the prior art.

According to a further preferred development, the cross member and/or the fitting part in the contact region with a rolling body has a recess so that the rolling body is guided through the recess. Advantageously, the recess in the contact region of the cross member and in the contact region of the fitting part allows a guidance of the rolling body and at the same time of the cross member. In particular, by two rolling bodies arranged mirror-symmetrically about the central point of the cross member, with a vertical mirror plane, which has a surface normal substantially parallel to the main direction of travel, the cross member is guided such that a vertical dynamic effect on the cross member through the recesses, together with the mirror-symmetrical rolling bodies, are received in the recesses. Rolling bodies on the upper or lower face of the cross member are not required in this arrangement. Such an arrangement is preferably provided, the mirror plane being aligned substantially horizontally and the surface normal of the mirror plane being aligned vertically.

According to a further preferred development, in a cross section parallel to the direction of travel the fitting part has L-shaped edges, in particular rounded edges, at least one rolling body being guided in an edge between the fitting part and the cross member or between the fitting part and the clamping element. Advantageously, by the guidance of the rolling bodies in the edges of the fitting part a locking of the rolling bodies is achieved in a simple manner between the cross member and the fitting part. Preferably, a fitting part is provided with a quadrangular internal periphery, the rolling bodies being arranged in two diagonally opposing inner edges or in all four edges relative to the cross section of the fitting part. Particularly preferably, for increasing the production tolerance of the individual components the arrangement of the clamping elements is additionally provided between the rolling bodies and the cross member.

According to a further preferred development, the cross member has two parallel hollow tubes and at least one strut, the hollow tubes being connected to one another by the at least one strut parallel and/or perpendicular thereto. Advantageously, therefore, in a particularly simple and cost-effective manner a relatively stable and torsionally rigid cross member is created, in particular by using relatively inexpensive standard components.

According to a further preferred development, the fitting part extends virtually over the entire length of the cross member, so that in a particularly advantageous manner a positive locking of the cross member relative to dynamic effects perpendicular to the cross member is carried out by the fitting part over almost the entire length of the cross member and thus a particularly stable rail system may be created.

According to a further preferred development, the clamping element comprises a leaf spring, the leaf spring preferably having an S-shape. Advantageously, therefore, a clamping element is produced in a simple and cost-effective manner. An S-shaped leaf spring comprises a first contact region for contact with the one rolling body or with a plurality of rolling bodies, as well as a second contact region for contact with the cross member, preferably the second contact region being located between two first contact regions.

A further subject of the present invention is a vehicle seat with a rail system according to the invention, the vehicle seat being fastened to the cross member and, in particular, to the ends of the cross member. Advantageously, therefore, a relatively stable fixing of the vehicle seat to the body of a vehicle is possible, the vehicle seat being displaceable in the transverse direction with relatively low force expenditure.

According to a further development, the vehicle seat is movable parallel and/or perpendicular to the main direction of travel. Advantageously, therefore, an adaptation of the seating position in the transverse direction and/or in the longitudinal direction is possible for an occupant.

DRAWINGS

Exemplary embodiments of the invention are shown in the drawings and explained in more detail in the following description, in which.

DETAILED DESCRIPTION

In the various figures, the same parts are always provided with the same reference numerals and are, therefore, generally only respectively mentioned once.

Figure 1A:
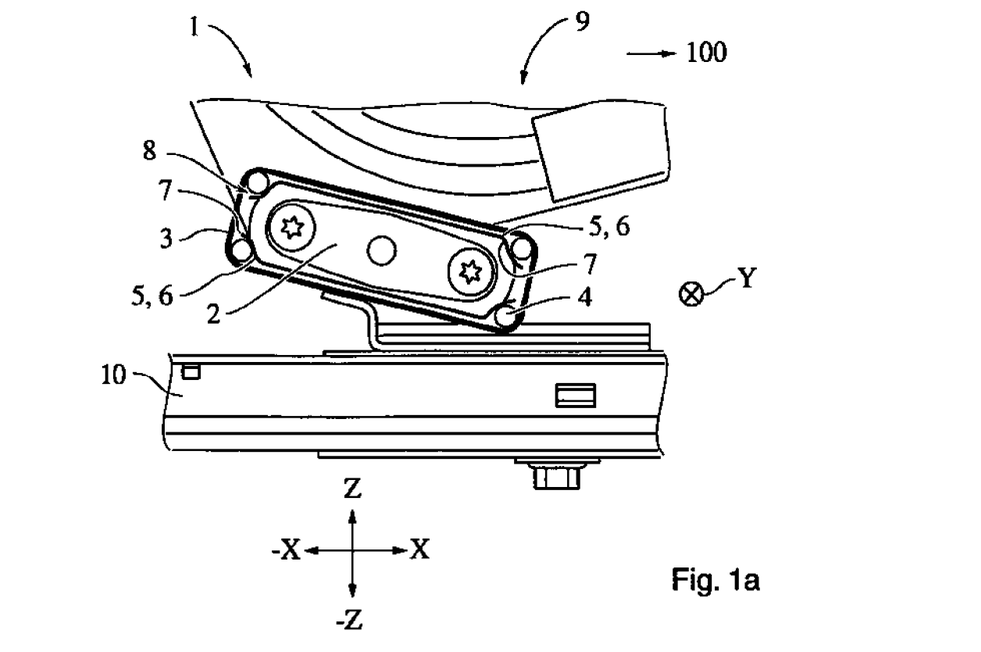
FIG. 1A shows a schematic cross-sectional view of a rail system according to the invention, according to a first embodiment of the present invention.
Figure 1B:
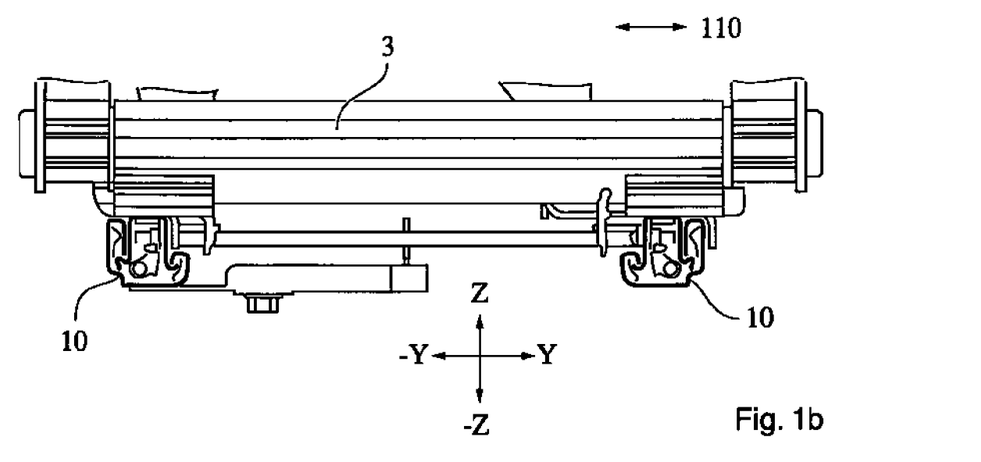
FIG. 1B shows a schematic front view of a rail system according to the invention, according to the first embodiment of the present invention.
Figure 1C:
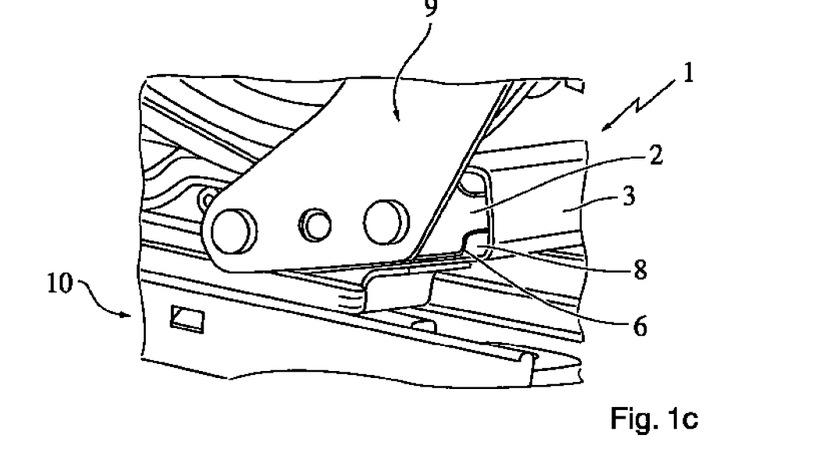
FIG. 1C shows a schematic perspective view of a rail system according to the invention, according to the first embodiment of the present invention.

In FIGS. 1a, 1b and 1c, a schematic cross-sectional view, a front view and a perspective view of a rail system 1 according to the invention for a vehicle seat 9 are shown, according to a first embodiment of the present invention, the rail system 1 having at least one profiled fitting part 3 and at least one cross member 2 which is arranged perpendicular to a main direction of travel 100, the at least one fitting part 3 completely surrounding the cross member 2, and the cross member 2 being able to be moved in relation to the fitting part 3 in a transverse direction perpendicular to the main direction of travel 100, and moreover, the rail system 1 having rolling bodies 4 which guide the cross member 2 in the interior of the fitting part 3 and are arranged between the cross member 2 and the fitting part 3. Viewed in cross section, the bearing arrangement as a whole has four rolling bodies 4 spaced apart from one another, said arrangement being repeated in the transverse direction 110 preferably at least twice, so that this bearing arrangement, therefore, provides support in all directions which deviate from the transverse direction 110. The cross member 4 is configured in cross section approximately elliptically and in the region of its smallest dimension is provided with two clamping elements 5 in the form of leaf springs 6 bearing tangentially against the cross member 2. The leaf springs 6 are, in particular, arranged opposite one another relative to the cross member 4, in parallel with one another and bear centrally on the cross member 4. With their free ends 7 bent in the manner of a collar, they project in the direction of the L-shaped edges 112 of the fitting part 3 which is of approximately rectangular configuration and form at that point, together with the fitting part 3, guide channels 8 for the rolling bodies 4 arranged in each edge 112 of the fitting part 3. The rolling bodies 4 are, in this connection, pressed by the pre-tensioned leaf springs 6 away from the cross member 2 in the direction of the fitting part 3. As a result of this configuration, tolerances on the inner periphery of the fitting part 3 may be compensated and the displacement forces reduced. The rail system 1 serving for the transverse displacement is positioned on two longitudinal rails 10 extending in the main direction of travel 100, and used for the longitudinal displacement. The fitting part 3 is shorter in the transverse direction than the length of the cross member 2 in the transverse direction, in order to allow the transverse displacement thereof relative to the cross member 2.

Figure 2A:
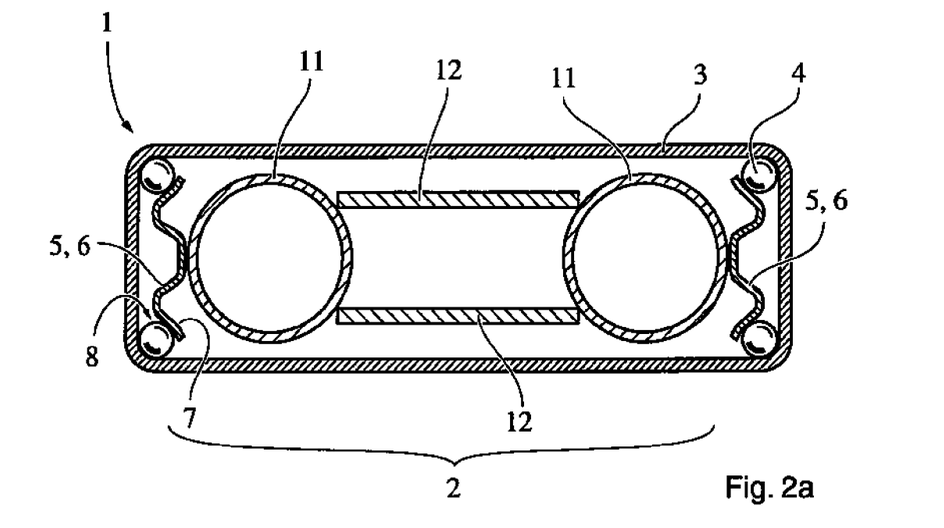
FIG. 2A shows a schematic cross-sectional view of a rail system according to the invention, according to a second embodiment of the present invention.
Figure 2B:
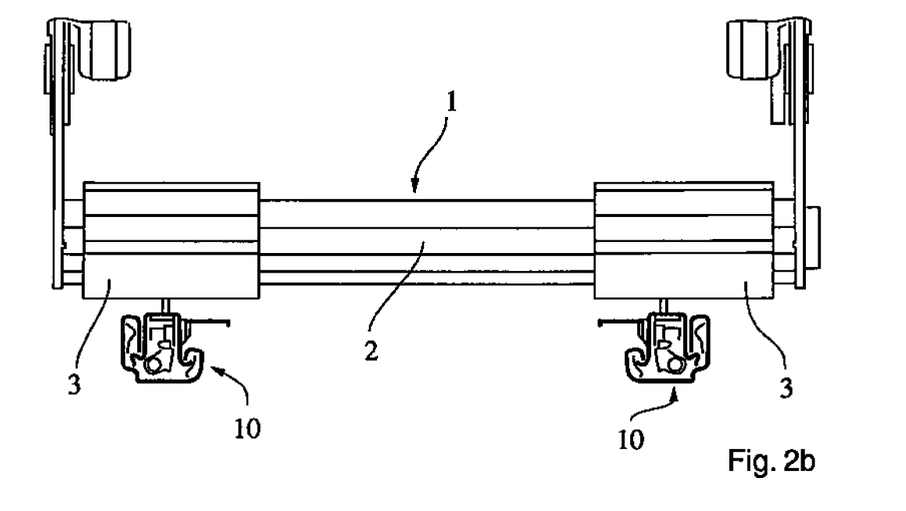
FIG. 2B shows a schematic front view of a rail system according to the invention, according to the second embodiment of the present invention.

In FIGS. 2a and 2b a schematic cross-sectional view and a front view of a rail system 1 according to the invention for a vehicle seat 9 are shown according to an exemplary second embodiment of the present invention, the second embodiment being substantially identical to the first embodiment shown in FIGS. 1a to 1c, the cross member 2 being made from two hollow tubes 11 extending parallel to one another, which are connected to one another via struts 12, for example by welding. The two leaf springs 6 are in the region of the greatest dimension of the cross member 2 tangentially positioned on the hollow tubes 11 and project in the direction of the edges 112 of the similarly rectangular fitting part 3, where they form the guide channels 8 by pre-tensioning. In FIG. 2b a seat system is shown which preferably comprises two specific fitting parts 3 which are arranged in the transverse direction (Y-direction) spaced apart from one another on a cross member 2.

Figure 3A:
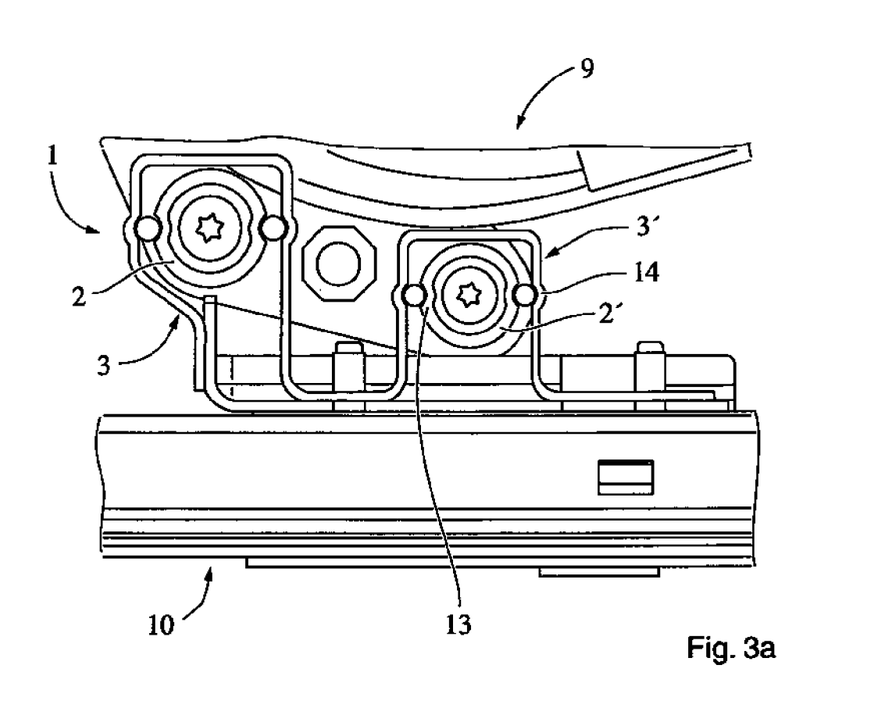
FIG. 3A shows a schematic cross-sectional view of a rail system according to the invention, according to a third embodiment of the present invention.
Figure 3B:
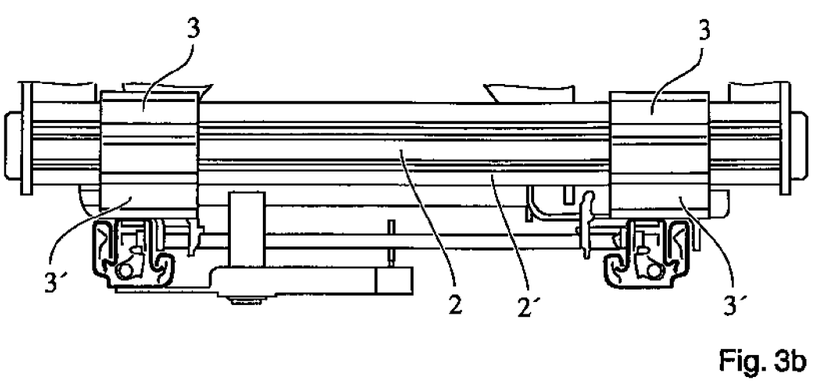
FIG. 3B shows a schematic front view of a rail system according to the invention, according to the third embodiment of the present invention.
Figure 3C:
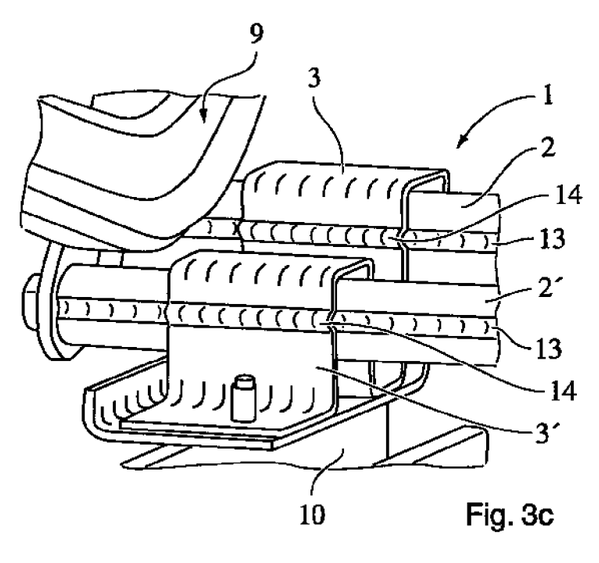
FIG. 3C shows a schematic perspective view of a rail system according to the invention, according to the third embodiment of the present invention.

In FIGS. 3a, 3b and 3c a schematic cross-sectional view, a front view and a perspective view of a rail system 1 according to the invention for a vehicle seat 9 are shown according to a third embodiment of the present invention, the third embodiment being substantially identical to the second embodiment shown in FIGS. 2a and 2b, two cross members 2, 2' being arranged spaced apart from one another in parallel. The cross members 2, 2' have a substantially circular cross section but are respectively provided with two opposing recesses and/or indentations 14 extending in the transverse direction, which form part of the guide channels 8. The cross members 2, 2' extend in two fitting parts 3, 3' which, for example, are in a single piece and are made spaced apart relative to one another, from a piece of sheet metal repeatedly bent back in a U-shape. In the region of the indentations 14 of the cross members 2, 2', the fitting parts 3, 3' also comprise corresponding recesses and bulged portions 13 in which two respective rolling bodies 4 run along a horizontal plane. By widening the fitting parts 3, in particular, production tolerances are compensated and the rail system 1 is pre-tensioned.

Figure 4A:
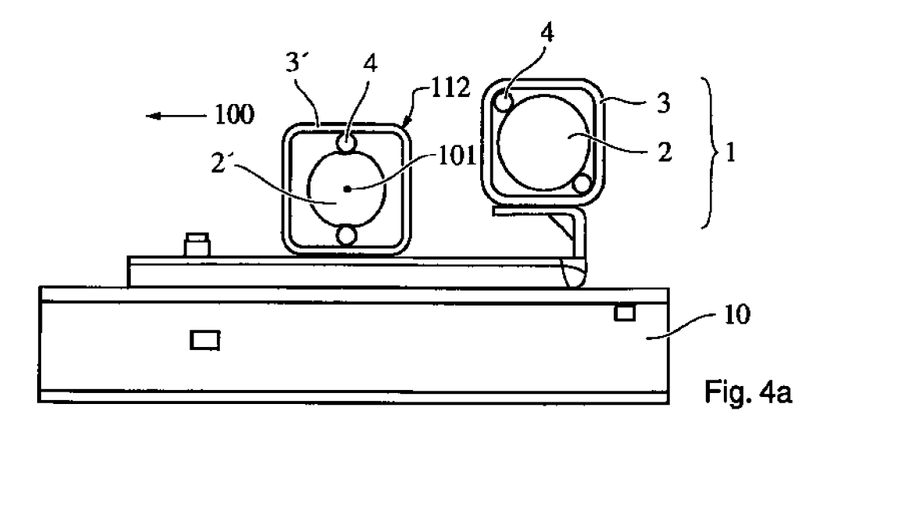
FIG. 4A shows a schematic cross-sectional view of a rail system according to the invention, according to a fourth embodiment of the present invention.
Figure 4B:
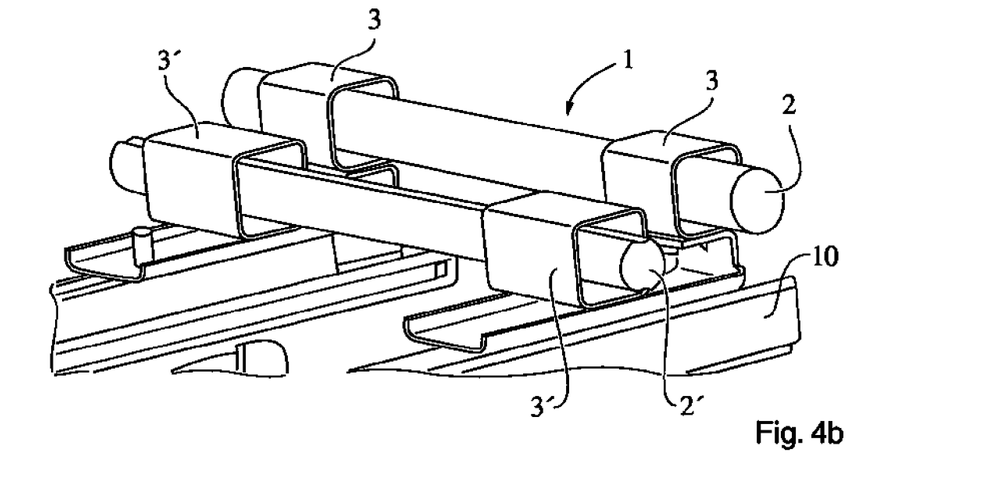
FIG. 4B shows a schematic perspective view of a rail system according to the invention, according to the fourth embodiment of the present invention, and FIGS. 5A and/or 5B show a schematic side view of a clamping element attached to the cross member and a rolling body.

In FIGS. 4a and 4b a schematic cross-sectional view and a perspective view of a rail system 1 according to the invention for a vehicle seat 9 are shown according to an exemplary fourth embodiment of the present invention, the fourth embodiment being substantially identical to the third embodiment, instead of the hollow tubes 11 as cross members 2, 2' two rods 15 made of solid material being shown. The respectively associated fitting parts 3, 3' are thus preferably made from a tubular profile with an approximately square cross section, respectively two rolling bodies 4 running in the fitting part 3' along a vertical plane, and in the fitting part 3 along a plane arranged diagonally to the fitting part 3.

Figure 5A:
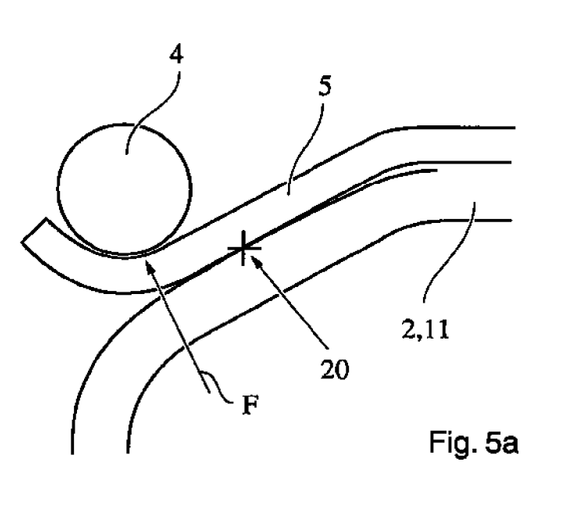
Figure 5B:
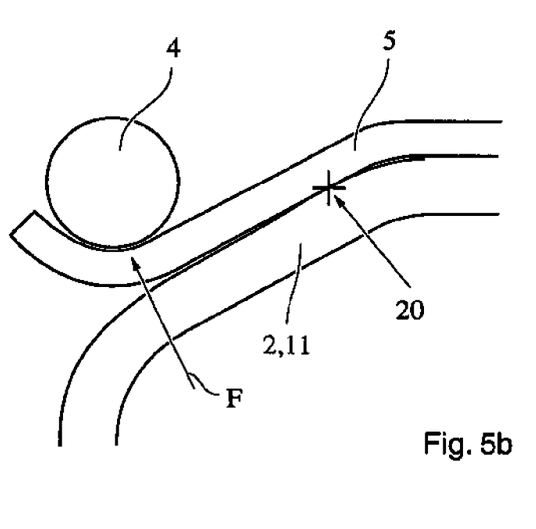

In FIGS. 5a and 5b are shown two different schematic side views of the clamping element 5 (for example in the form of a leaf spring) attached to the cross member 2 (and/or to the hollow tube 11 of the cross member) as well as views of the rolling body 4. Proceeding therefrom, the shape of the clamping element 5 relative to the cross member 2 and/or to the hollow tube 11 of the cross member 2 is provided such that a contact point 20 between the clamping element 5 and the hollow tube 11 and/or the cross member 2 defines the effective lever length of the spring action of the clamping element 5. The characteristic curve of the clamping element 5 is thus provided progressively, such that the contact point 20 is displaced when loading and/or unloading the clamping element 5 (i.e. with a more or less large deflection of the clamping element 5). As a result, the effective length of the lever arm of the clamping element 5 is also altered. In FIG. 5b, for example, the arrangement of the clamping element 5 relative to the rolling body 4 is shown in the nominal position, in which the contact point 20 between the clamping element 5 and the cross member 2 is moved relatively far away from the line of action of the force F (and/or counter force) acting between the clamping element 5 and the rolling body 4. If due to dimensional tolerances a rolling body 4 is incorporated with a larger diameter, the situation shown in FIG. 5a is present, in which the contact point 20 between the clamping element 5 and the cross member 2 runs closer to the line of action of the force F (and/or counter force) acting between the clamping element 5 and the rolling body 4, which leads to a shortened lever arm (substantially the path of the clamping element 5 between the contact point 20 and the point of intersection with the line of action of the force F) and thus to a rising (i.e. progressive) spring characteristic curve of the clamping element 5.

The invention claimed is:

1. A rail system for a vehicle seat comprising at least one profiled fitting part, and at least one cross member which is arranged perpendicular to a longitudinal direction of travel of the vehicle seat, the at least one fitting part completely surrounding the cross member, and the cross member being able to be moved in relation to the fitting part perpendicular to the longitudinal direction of travel of the vehicle seat, and rolling bodies which guide the cross member in the interior of the fitting part and are arranged between the cross member and the fitting part;
wherein a clamping element is disposed between the cross member and at least one rolling body, wherein a dynamic effect of the rolling body is produced in the direction of the fitting part by a clamping force of the clamping element;
wherein the fitting part is arranged on longitudinal rails and is displaceable relative to the longitudinal rails parallel to the longitudinal direction of travel of the vehicle seat.

2. The rail system as claimed in claim 1, wherein the clamping element has a progressive characteristic curve as regards dimensional tolerances of the rolling body.

3. The rail system as claimed in claim 1, wherein at least two rolling bodies are arranged mirror-symmetrically and/or rotationally-symmetrically about the cross member.

4. The rail system as claimed in claim 3, wherein the at least two rolling bodies are arranged mirror-symmetrically about the cross member, with a mirror plane extending through a central point of the cross member in a longitudinal direction.

5. The rail system as claimed in claim 3, wherein the at least two rolling bodies are arranged rotationally symmetrically about the cross member, with a rotational axis extending through a central point of the cross member in a longitudinal direction.

6. The rail system as claimed in claim 1, wherein in a cross section parallel to the longitudinal direction of travel of the vehicle seat the fitting part has L-shaped edges, and at least one rolling body is guided in an edge.

7. The rail system as claimed in claim 6, wherein the L-shaped edges are rounded edges.

8. The rail system as claimed in claim 6, wherein the at least one rolling body is guided in the edge between the fitting part and the cross member.

9. The rail system as claimed in claim 6, wherein the at least one rolling body is guided in the edge between the fitting part and the clamping element.

10. The rail system as claimed in claim 1, wherein the cross member has two parallel hollow tubes and at least one strut, the hollow tubes being connected to one another by the at least one strut parallel or perpendicular thereto.

11. The rail system as claimed in claim 1, wherein the fitting part extends over virtually the entire length of the cross member.

12. A vehicle seat with a rail system as claimed in claim 1, wherein the vehicle seat is fastened to the cross member.

13. The vehicle seat as claimed in claim 12, wherein the vehicle seat is movable parallel and/or perpendicular to the longitudinal direction of travel of the vehicle seat.

14. The vehicle seat as claimed in claim 12, wherein the vehicle seat is fastened to ends of the cross member.

15. A rail system for a vehicle seat comprising at least one profiled fitting part, and at least one cross member which is arranged perpendicular to a longitudinal direction of travel of the vehicle seat, the at least one fitting part completely surrounding the cross member, and the cross member being able to be moved in relation to the fitting part perpendicular to the longitudinal direction of travel of the vehicle seat, and rolling bodies which guide the cross member in the interior of the fitting part and are arranged between the cross member and the fitting part;
wherein the fitting part extends over virtually the entire length of the cross member;
wherein the vehicle seat is fastened to the cross member, and the vehicle seat is movable parallel and/or perpendicular to the longitudinal direction of travel of the vehicle seat.

16. The rail system as claimed in claim 15, wherein in a cross section parallel to the longitudinal direction of travel of the vehicle seat the fitting part has L-shaped edges, and at least one rolling body is guided in an edge.

17. A rail system for a vehicle seat comprising at least one profiled fitting part, and at least one cross member which is arranged perpendicular to a longitudinal direction of travel of the vehicle seat, the at least one fitting part completely surrounding the cross member, and the cross member being able to be moved in relation to the fitting part perpendicular to the longitudinal direction of travel of the vehicle seat, and rolling bodies which guide the cross member in the interior of the fitting part and are arranged between the cross member and the fitting part;
wherein a clamping element is disposed between the cross member and at least one rolling body, wherein a dynamic effect of the rolling body is produced in the direction of the fitting part by a clamping force of the clamping element;
wherein the clamping element comprises a leaf spring.

18. The rail system as claimed in claim 17, wherein the leaf spring has an S-shape.

19. The rail system as claimed in claim 17, wherein the fitting part is arranged on longitudinal rails and is displaceable relative to the longitudinal rails parallel to the longitudinal direction of travel of the vehicle seat.

* * * * *